(12) United States Patent
Schaaf (10) Patent No.: US 9,982,988 B2
(45) Date of Patent: *May 29, 2018

(54) DISPLACEMENT SENSOR FOR CONTACTLESSLY MEASURING A RELATIVE POSITION BY MEANS OF A MAGNETIC FIELD SENSOR ARRAY ON THE BASIS OF THE HALL EFFECT

(71) Applicant: TE Connectivity Germany GmbH, Bensheim (DE)

(72) Inventor: Oliver Schaaf, Lustadt (DE)

(73) Assignee: TE Connectivity Germany GmbH, Bensheim (DE)

( * ) Notice: Subject to any disclaimer, the term of this patent is extended or adjusted under 35 U.S.C. 154(b) by 525 days.

This patent is subject to a terminal disclaimer.

(21) Appl. No.: 14/394,082

(22) PCT Filed: Apr. 8, 2013

(86) PCT No.: PCT/EP2013/057277
§ 371 (c)(1),
(2) Date: Oct. 10, 2014

(87) PCT Pub. No.: WO2013/153015
PCT Pub. Date: Oct. 17, 2013

(65) Prior Publication Data
US 2015/0081246 A1    Mar. 19, 2015

(30) Foreign Application Priority Data
Apr. 11, 2012    (DE) ........................ 10 2012 205 903

(51) Int. Cl.
*G01C 9/00*    (2006.01)
*G01B 7/00*    (2006.01)
*G01D 5/14*    (2006.01)

(52) U.S. Cl.
CPC ............... *G01B 7/00* (2013.01); *G01D 5/145* (2013.01)

(58) Field of Classification Search
CPC ........ G01D 5/145; G01D 5/12; G01D 5/2448; G01B 7/00; G01B 7/14; G01R 33/07
(Continued)

(56) References Cited

U.S. PATENT DOCUMENTS

| 6,731,108 | B2 | 5/2004 | Zalunardo et al. |
| 9,057,629 | B2 * | 6/2015 | Hohe ..................... G01D 5/145 |
| 2013/0027028 | A1 | 1/2013 | Hohe et al. |

FOREIGN PATENT DOCUMENTS

| DE | 102010003292 A1 | 9/2011 |
| EP | 1243897 A1 | 9/2002 |

OTHER PUBLICATIONS

International Search Report and Written Opinion issued by the European Patent Office dated Jul. 3, 2013, for International PCT Application No. PCT/EP2013/057277; 9 pages.

* cited by examiner

*Primary Examiner* — An Do
(74) *Attorney, Agent, or Firm* — Faegre Baker Daniels LLP (57) ABSTRACT

A displacement sensor is disclosed for contactlessly measuring a relative position of a magnetic field source which produces a magnetic field and a magnetic field sensor in relation to each other, wherein the magnetic field source and the magnetic field sensor are movable relative to each other. Each magnetic field probe detects at least two spatial components of a magnetic flux density of the magnetic field. A storage unit stores individual position signals. A control and calculation unit calculates an output signal of the displacement sensor based on the position signals, and calculates a magnitude of the magnetic flux density and compare it with (Continued)

a predetermined threshold value to output a current calculated position signal for each magnetic field probe if the magnitude is greater than the threshold value and to output a preceding stored position signal if the magnitude is less than or equal to the threshold value.

15 Claims, 7 Drawing Sheets

(58) Field of Classification Search
USPC ....... 702/127, 150, 151; 324/207.11, 207.24, 324/207.25
See application file for complete search history.

Fig. 14

DISPLACEMENT SENSOR FOR CONTACTLESSLY MEASURING A RELATIVE POSITION BY MEANS OF A MAGNETIC FIELD SENSOR ARRAY ON THE BASIS OF THE HALL EFFECT

The present invention relates to a displacement sensor for contactlessly measuring a relative position of a magnetic field source which produces a magnetic field and a magnetic field sensor in relation to each other. The present invention further also relates to a corresponding measurement method for establishing the position.

By means of the method according to the invention, in particular linear movements are intended to be detected and evaluated contactlessly by means of magnetic interaction between one or more permanent magnets and a magnetic sensor arrangement based on the Hall effect.

The measurement of linear movements is used, for example, for controlling machine tools, in pneumatics, in automation technology and robotics, and in the automotive sector. Contactless detection of movements affords the advantage inter alia of freedom from wear. The optical and magnetic methods are the most widespread among the contactless measurement methods. Whilst the optical methods ensure a very high level of precision owing to the small wavelength of the light, magnetic methods are far less sensitive to dirt and damage, in particular because magnets and sensor components can be completely enclosed in a non-magnetic hermetic casing.

Various manufacturers market displacement sensor systems in which the position of a displaceable permanent magnet is established by means of a two or three-dimensional Hall sensor.

In order to detect the relative linear movements at a location, two mutually perpendicular magnetic field components are measured and their quotient is evaluated to detect the position. This method has the advantage that, in regions in which a field component assumes an extreme value and therefore does not detect small displacements, the other field component reacts all the more strongly to displacements such that a substantially equally high level of measurement precision is provided across the full measurement range.

Furthermore, this principle has the advantage that it is comparatively not very sensitive to a change in the absolute magnetic field strength because proportional numbers between the field components are used to detect the position.

European patent specification EP 0979988 B1 discloses different measurement methods for contactless magnetic detection of relative linear movements between permanent magnets and electronic sensors. In order to detect the relative linear movements by means of the electronic sensors, there are detected at a position two mutually perpendicular field components whose quotient is evaluated in order to detect the position.

In a second method variant, the known measurement method can also be carried out in such a manner that, in order to detect the relative linear movements by means of the electronic sensors, there are detected at two locations two mutually perpendicular field components whose quotient is evaluated in order to detect the position.

The published European patent application EP 2159546 A2 discloses a measurement method for contactless detection of relative linear movements between a sensor arrangement for detecting two mutually perpendicular magnetic field components (R, A) and a permanent magnet. A two or three-dimensional Hall sensor is used in place of individual sensors for detecting various field components. The quasi linear position measurement line is formed by the function $U=y-e+g$, where y is the functional relationship of the field components and e and g are predeterminable voltage values. In particular, a quasi linear position measurement line $U=f(y)$ is formed from the output signals of the Hall sensor according to the relationship $y=a+b \cdot R/f(c \cdot R''+d \cdot A'')$, where R is the radial field component, A is the axial field component, U is the measurement voltage and a, b, c, d and n are constant factors.

The published European patent application EP 1243897 A1 relates to a magnetic displacement sensor which comprises a magnetic field source and a magnetic field sensor which can be displaced relative to each other along a predetermined path. The magnetic field sensor measures two components of the magnetic field produced by the magnetic field source. There is then derived from the measured components a position signal which constitutes the relative position of the magnetic field sensor and magnetic field source. The explanations set out in this publication in respect of the displacement sensor are distinguished in that the establishment of the position signal includes a division of the two measured components of the magnetic field.

However, these known methods have the disadvantage that the magnetic control field becomes very weak at the ends of the measurement range such that the components of the magnetic flux density used to calculate the position assume small values and therefore the signal-to-noise ratio of both values becomes unfavourable for the calculation.

European patent specification EP 1071919 B1 further discloses a sensor arrangement and a method for magnetic position establishment having a correction for non-linear sensor ranges, in which a plurality of magnetic field converters are arranged along the displacement path of a permanent magnet. Each of these converters supplies a one-dimensional output signal which changes as the magnet approaches each converter, moves past it and moves away from it again. In this arrangement, non-linearities which occur in the characteristic line transition range between two magnetic field converters are intended to be eliminated by two converters being combined in the evaluation and further fixedly predetermined offset values being added to the output signal calculated therefrom. However, that known arrangement is not capable of using the advantages of an arctangent calculation by means of a multi-dimensional Hall sensor and further requires a very substantial processing complexity for the calibration.

Figure 1:
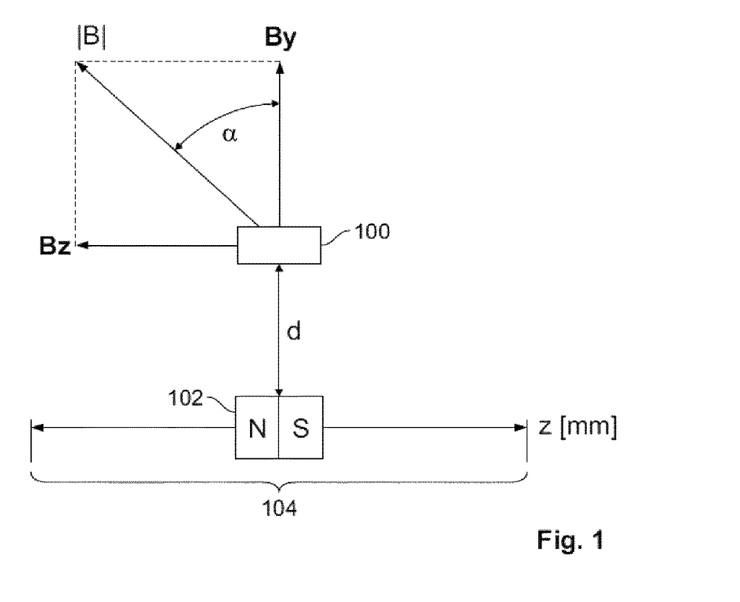
FIG. 1 is a schematic illustration of a 3D Hall probe.

FIG. 1 shows an arrangement in which a Hall sensor 100 is arranged in a fixed position, for example, on a housing, in order to contactlessly detect a linear movement and detects the magnetic field of a movable permanent magnet 102. In accordance with the north/south polarisation in the direction of movement of the permanent magnet 102, the magnetic field extending in the direction of movement is subsequently referred to as the magnetic field component Bz and the component extending transverse thereto is subsequently referred to as By. The entire measurement range in the z direction which is covered by the Hall sensor 100 is indicated by the reference sign 104.

Figure 2:
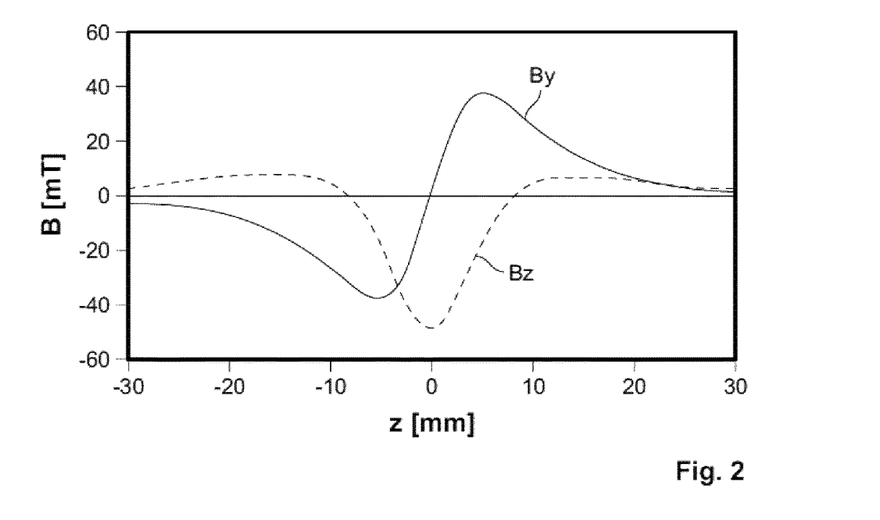
FIG. 2 shows the path of the magnetic field components produced in accordance with the position of the permanent magnet in relation to an individual Hall probe.

FIG. 2 shows the path of the components By and Bz of the magnetic flux density in accordance with the location z at which the permanent magnet 102 is located. In this case, the zero position is the position at which the permanent magnet 102 and the sensor 100 are directly opposite each other.

The angle α which can be calculated in accordance with the following equation (1) is used as the measurement signal in this case.

$$\alpha = \arctan\left(\frac{Bz}{By}\right) \quad (1)$$

Figure 3:
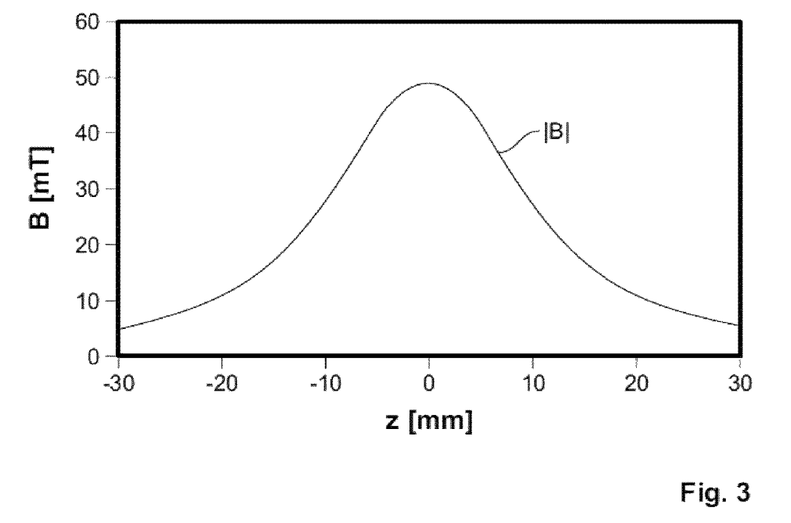
FIG. 3 shows the path of the magnitude of the magnetic flux calculated from the magnetic field components produced at the location of the Hall probe from FIG. 1.

The path of the magnitude $|\vec{B}|$ of the magnetic flux density is shown in FIG. 3 as a function of the location z. The vector magnitude $|\vec{B}|$ of the magnetic flux density is calculated in a known manner from the individual components By and Bz in accordance with the following equation (2). Corresponding calculation rules apply as is conventional for the person skilled in the art when using other coordinate systems and also when including a third magnetic field component Bx.

$$|\vec{B}| = \sqrt{By^2 + Bz^2} \quad (2)$$

Figure 4:
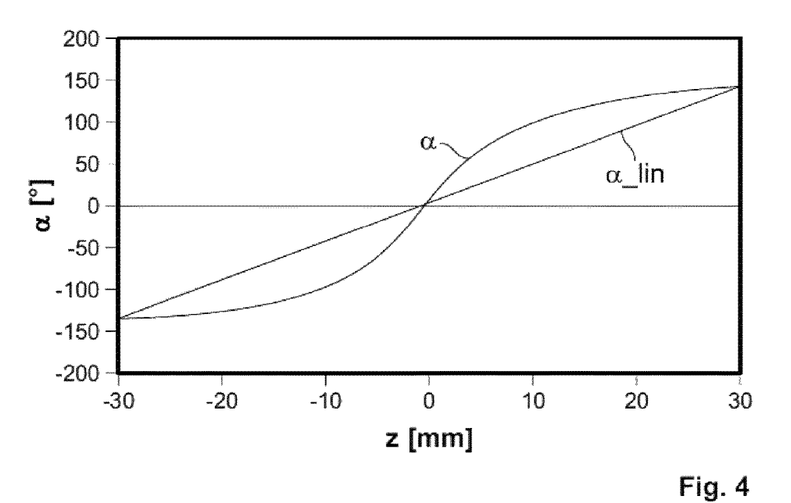
FIG. 4 shows the path of the angle α calculated from the magnetic field components produced and the path of a linearised angle.
Figure 5:
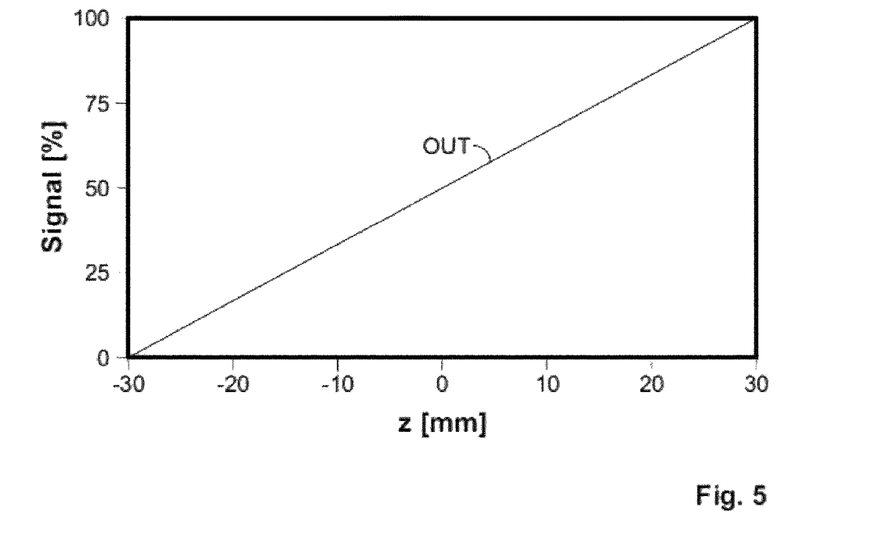
FIG. 5 shows the path of the output signal of the sensor as a function of the position z.

As illustrated in FIG. 4, the angle α depends comparatively linearly on the position of the permanent magnet 102 up to a given limit value in relation to the Hall sensor 100. The currently measured characteristic line is generally further linearised, as illustrated in FIG. 4 by means of the line α_lin. That linearised line α_lin then forms the output characteristic line of the sensor. FIG. 5 shows the path of the position signal OUT output by the sensor.

Most commercially conventional 3D Hall sensors can be operated only in the presence of a sufficiently powerful magnetic field. If the permanent magnet is located outside the detection range of the sensor, no sensor signal is available any longer.

There are further known arrangements in which a so-called "clamping", that is to say, omission of the measurement values at the measurement range edge, is carried out. A fixedly predetermined value independent of the current measurement is output in place of the actual measurement values which are no longer reliable. U.S. Pat. No. 6,502,544 B2 describes a Hall sensor of this type for a throttle valve arrangement in which the sensor signals are set to the lower or upper clamping voltage which constitutes the minimum or maximum possible output voltage of the sensor respectively.

However, such clamping voltages are not flexible enough for specific technical applications because they are fixedly preset and do not depend on the current measurement value.

Therefore, it is proposed in the German patent application DE 10 2012 203 225.8 that the magnetic field sensor be additionally provided with a storage unit which allows a valid sensor signal to further be output when the control by the magnetic field source is lost. In particular, the last still reliably determined position value is stored and output until the permanent magnet has moved again so far in the direction towards the sensor that it produces a sufficiently strong magnetic field therein. The sensor then outputs current measurement values again in place of the stored value. Given that the sensor outputs a valid output signal at any time, it can theoretically be used for travel paths of any length without subsequent hardware and software being disrupted by the signal outside permitted values.

Using the knowledge set out in the German patent application DE 10 2012 203 225.8, it is now possible to produce further improvements in Hall sensors which could not previously be achieved or achieved only with extremely high complexity.

In particular, the object of the present invention is to improve a displacement sensor and an associated measurement method for contactless position detection such that the measurement range can be substantially increased and, at the same time, a smaller magnet can be used as the magnetic field source.

This object is achieved by the subject-matter of the independent claims. The dependent claims relate to advantageous developments of the present invention.

The present invention is based on the concept that the magnetic field sensor which detects the position of the magnetic field source has a plurality of magnetic field probes. Each of the magnetic field probes outputs a position signal and this position signal is based on at least two spatial components of the magnetic flux density of the magnetic field. There is provided a control and calculation unit which outputs a total output signal of the displacement sensor on the basis of the plurality of position signals. A storage unit which stores the individual position signals is provided according to the invention. The control and calculation unit decides on the basis of a calculated magnitude of the magnetic flux density which is measured at the location of each of the magnetic field probes whether a current position signal is output as the position signal or whether the preceding stored position signal should be output and be taken as a basis for the subsequent calculation.

By monitoring the magnitude of the magnetic flux density at the location of the sensor, it is possible in a particularly simple and efficient manner to determine the state in which the magnetic field source has reached a distance from the magnetic field sensor which is too large to still ensure a satisfactory signal-to-noise ratio. Since the sensor detects the individual magnetic field flux density components in any case, no additional technical measurement complexity is necessary for calculating the magnitude of the magnetic flux density, but rather only a calculation needs to be carried out.

Thus, it is advantageously possible to achieve a stable measurement signal over a relatively large travel path without having to accept an excessively large magnet or an excessive processing complexity.

The advantages according to the invention can be achieved particularly readily if a two or three-dimensional Hall sensor is used as a magnetic field probe and the magnetic field source comprises at least one permanent magnet.

The advantages of a calculation of the output signal using the arctangent function are utilised by each of the position signals being calculated on the basis of the quotient of the two magnetic flux density components according to equation (1).

The storage unit according to the invention for storing the respective position signals may be either part of each of the individual magnetic field probes or be located in the superordinate control and calculation unit. This is mainly dependent on the specific construction of the magnetic field probes/ICs. The more intelligence is assigned to an individual magnetic field probe, the less processing capacity is accordingly necessary in the central control and calculation unit.

A method for contactlessly measuring a relative position by means of the sensor arrangement according to the invention comprises the following steps:
calculating a plurality of position signals on the basis of a quotient of the two magnetic flux density components;
calculating a magnitude of the magnetic flux density at the location of each magnetic field probe and comparing the magnitude with a predetermined threshold value;
outputting each current calculated position signal if the magnitude of the magnetic flux density is higher than the threshold value;

outputting a preceding stored position signal if the magnitude of the magnetic flux density is smaller than or equal to the threshold value;

storing the output position signals for each magnetic field probe;

calculating an output signal of the displacement sensor on the basis of the plurality of position signals.

By means of this method according to the invention, it is possible to achieve a linear interference-immune signal in a wide measurement range with a comparatively small magnet by selecting the calculation rules accordingly when the output signal is calculated. In particular, the output signal of the displacement sensor can be established on the basis of the plurality of the position signals in that the respective position signals are added together for all the magnetic field probes and that sum term is subsequently divided by the total number of magnetic field probes. This constitutes a comparatively simple calculation rule which nevertheless ensures that the output value remains within the standardised limits which are expected by subsequent peripheral devices for a displacement sensor.

A high level of precision is already ensured for each individual position signal in that each individual position signal is established according to the calculation rule according to equation (1).

The storage according to the invention of the position signal can comprise either the storage of the angle value or the storage of an additionally processed linearised value of that angle. The variant which is selected in this instance is again dependent on how much processing capacity and intelligence is available in the individual magnetic field probes.

For a better understanding of the present invention, it is explained in greater detail with reference to the embodiments illustrated in the following figures. Identical components are indicated using the same reference numerals and the same component designations. Furthermore, individual features or feature combinations from the embodiments shown and described may also constitute independent solutions which are inventive per se or solutions according to the invention.

The invention will now be explained in greater detail below with reference to the figures.

A displacement sensor arrangement having a single Hall probe is shown in FIG. 1. In this arrangement a Hall sensor 100 is mounted in a fixed position whilst a permanent magnet 102 is supported in a linearly movable manner in relation to the Hall sensor 100. The permanent magnet 102 is polarised in such a manner that its north/south axis is orientated parallel to the direction of movement. In principle, however, the principles of the present invention may also be applied to arrangements in which the permanent magnet 102 is polarised in such a manner that its north/south axis extends transverse to the direction of movement. The permanent magnet 102 can be displaced out of the zero position shown in FIG. 1 in two directions by a displacement path 104 determined by the respective applications. The Hall sensor 100 detects at least two orthogonal magnetic field components—one which extends along the movement line and one which extends transverse thereto (see FIG. 2). Vector addition of the two components provides the magnitude of the magnetic field $|\vec{B}|$, as illustrated in FIG. 3. The angle α is defined as the angle which is enclosed by the total magnetic field vector $|\vec{B}|$ with the perpendicular relative to the direction of movement.

As already mentioned, the angle α is calculated from the magnetic field components in or transverse relative to the direction of movement according to equation (1):

$$\alpha = \arctan\left(\frac{Bz}{By}\right) \quad (1)$$

The calculated angle α is linearised in order to be available as a displacement-proportional output signal OUT, as illustrated in FIGS. 4 and 5.

Naturally, the principles according to the invention may also be transferred to other magnetic field sources, for example electromagnets, and to other magnetic field sensors, such as magnetoresistive sensors or inductive sensors.

In the present description, on the one hand, the values of the magnetic field in the direction of movement Bz and, on the other hand, the values of the magnetic field transverse to the direction of movement By are used as the magnetic field components which are measured in accordance with the position of the permanent magnet 102 in the magnetic field sensor, in this instance a Hall sensor 100. Naturally, the values Bx extending orthogonally to By can also be used for the calculation.

Figure 6:
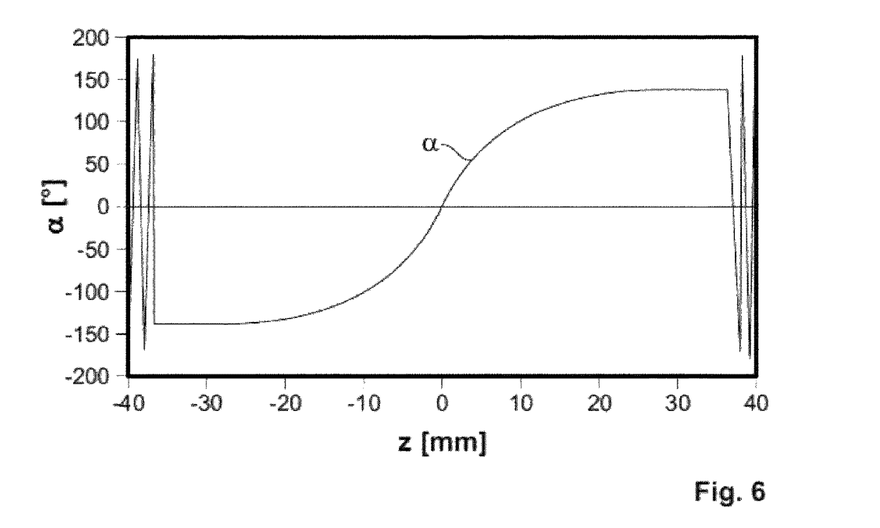
FIG. 6 shows the path of the angle α for displacement paths outside the actual measurement range of the Hall probe from FIG. 1.

FIG. 6 shows the angle α calculated according to equation (1) for a more extensive displacement range between −40 and +40 mm for the arrangement of FIG. 1, in which the 3D Hall sensor 100 is positioned at the centre of the measurement path to be detected. At the position z=0, the magnitude of the magnetic control field $|\vec{B}|$ is at a maximum. At the measurement range ends (in this instance: at z values of more than +35 or −35 mm), the magnetic control field becomes very weak such that the values for By and Bz for calculating the angle become very small and accordingly the signal-to-noise ratio of both values becomes unfavourable for the calculation. This results in a great variation up to an oscillation of the value α at the measurement range ends (−180° or +180°), as illustrated in FIG. 6.

Figure 7:
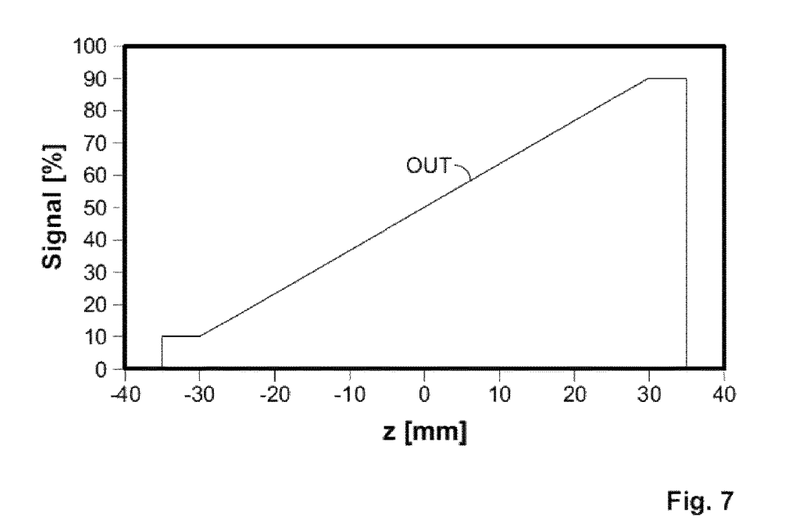
FIG. 7 is an illustration of the output signal of a Hall sensor without a storage unit during operation with a large displacement path.

In order to suppress this undesirable behaviour, the magnitude $|\vec{B}|$ is continuously monitored in some known sensors. If a value falls below a minimum value, the sensor signal is switched off or a value outside the admissible characteristic line range is output. This is illustrated in FIG. 7. In this instance, the sensor is switched off for a range z<−35 mm and z>+35 mm and the displacement position of the magnet can no longer be illustrated. The signal-to-noise ratios of the magnetic flux densities By or Bz therefore delimit the maximum possible displacement range of the magnet in these known sensors because the components of the magnetic flux density still have to be large enough to supply a meaningful measurement signal.

Figure 8:
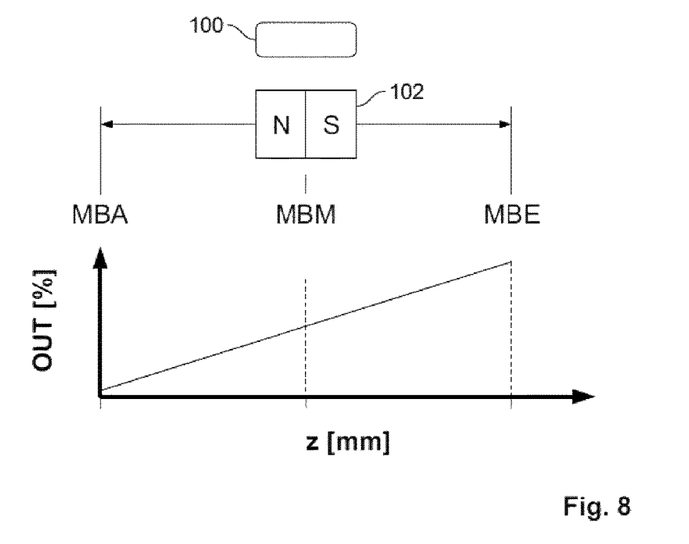
FIG. 8 is a schematic illustration with a sensor arrangement for detecting an edge region of the measurement range.

As shown in FIG. 8, a larger control magnet can be used to increase the measurement range, where MBA denotes the start of the measurement range, MBE the end of the measurement range and MBM the centre of the measurement range.

In contrast, DE 10 2012 203 225.8 proposes a 3D Hall sensor 102 having a storage unit 106.

Advantageously, the sensor 100 has a storage device 110 which is capable of functioning as a latch to store the last current value a before the magnet leaves the detection range. Alternatively or additionally, the linearised output value OUT which may optionally be further processed in another manner can also be stored.

The sensor outputs this value until the magnet 102 is brought back into the detection range of the sensor 100. In other words: the 3D Hall sensor 100 is supplemented by a storage function of the last valid output value such that displacement ranges of the magnet which are infinitely large in theory are possible in the measurement arrangement with the sensor nevertheless behaving in a stable manner.

The magnet leaving the detection range is evaluated by means of the magnitude of the flux density $|\vec{B}|$. If the magnitude $|\vec{B}|$ is smaller than a threshold value for the minimum flux density Bmin, the last valid value of α is stored as the storage value α-_latched and is additionally used for the calculation of the output signal OUT.

Depending on how narrow the admissible range is selected to be for the magnitude of the B field, the position of the stored values and the scope of the remaining linear range change. A limitation to greater threshold values Bmin has the advantage that the signal-to-noise ratio is greater and the risk of disruptions is lower, but has the disadvantage that the actual dynamic measurement range is narrower.

Figure 9:
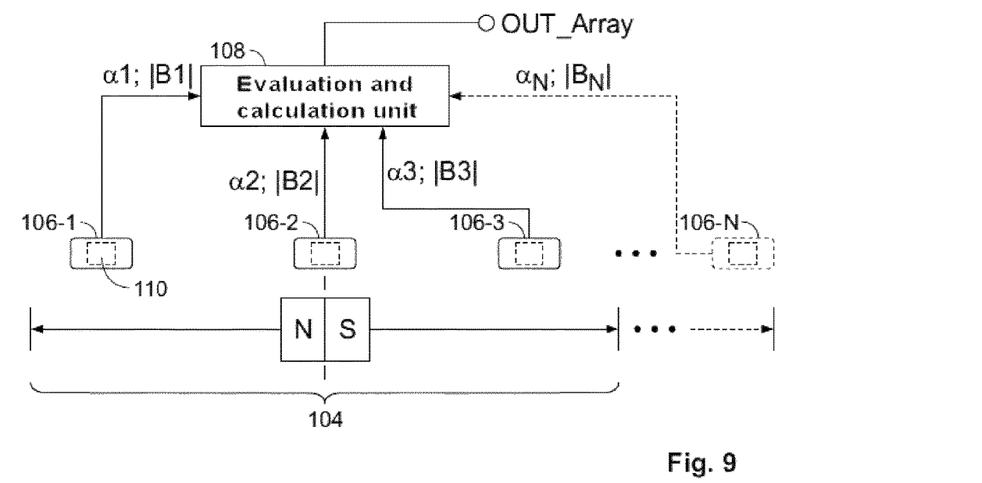
FIG. 9 is a schematic illustration of a sensor arrangement provided with a plurality of magnetic field probes.

The latch function proposed in DE 10 2012 203 225.8 in the event that the Hall probe loses the control magnetic field of the permanent magnet 102 can be used according to the present invention for a particularly efficient increase of the measurement range. As illustrated in FIG. 9, according to the invention, a plurality of magnetic field probes 106-1 to 106-N are arranged along the displacement path 104 in place of only a single Hall sensor. The permanent magnet 102 moves during operation of the displacement sensor along the displacement path 104 towards the individual Hall probes and subsequently away from them again. From the perspective of each individual Hall probe 106-1 to 106-N, therefore, the control by the permanent magnet initially becomes increasingly powerful until it is at a maximum and then decreases again until it is completely lost.

According to the invention, each Hall probe 106-1 to 106-N supplies as a position signal currently measured values for the angle α as long as the magnetic field strength |B1|, |B2|, |BN| measured at the position thereof is sufficiently high. If the magnitude of the magnetic field strength at the position of the associated probe is smaller than a defined threshold value, the last valid measured value is used as the corresponding position signal. It is insignificant whether the comparison of the magnetic field magnitude and the storage of the angle signals takes place directly in the respective Hall probes 106-1 to 106-N or only in the superordinate evaluation and calculation unit 108. If Hall probes 106-1 to 106-N are used with greater intelligence and an integrated storage function, this has the advantage that the influence of stray distortions can be reduced by the measurement value processing in situ. On the other hand, the arrangement of the storage unit 110 in the evaluation and calculation unit 108 has the advantage that commercially available Hall probes can be used without any modification.

Figure 10:
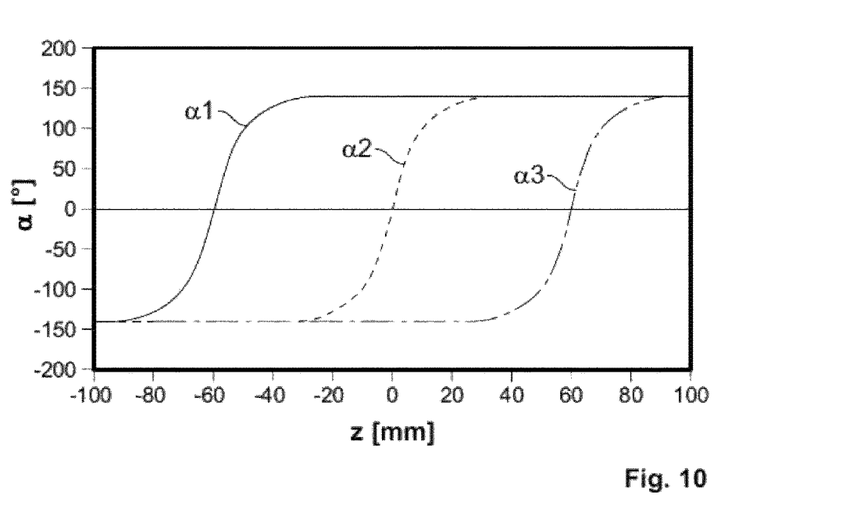
FIG. 10 shows the path of the calculated angle α for the individual magnetic field probes of an arrangement as in FIG. 9 using the example of three probes.

FIG. 10 shows the individual position signals α1, α2, α3 for a sensor arrangement having three magnetic field probes 106-1, 106-2, 106-3 in accordance with the displacement path 104. According to the present invention, each probe supplies valid measurement values over the entire displacement range, extending in this case from −100 mm to +100 mm, the zero point for the angle line being directly at the position of the individual magnetic field probe in each case. At the edge regions, the last valid position values are output in a stable manner until the permanent magnet 102 controls the respective Hall probes 106-1 to 106-3 again. The three signals α1, α2 and α3 obtained in that manner, in contrast to the known arrangements having more than one magnetic field probe, do not have any discontinuities in the edge regions of the individual transfer lines to be combined, and the combination of these signals to form a total signal can readily be carried out by means of suitable calculation rules.

For example, the following equation (3) can be used to calculate a total measurement signal α_total.

$$\alpha_{total} = \frac{\alpha 1 + \alpha 2 + \alpha 3 + \ldots + \alpha N}{N} \tag{3}$$

Figure 11:
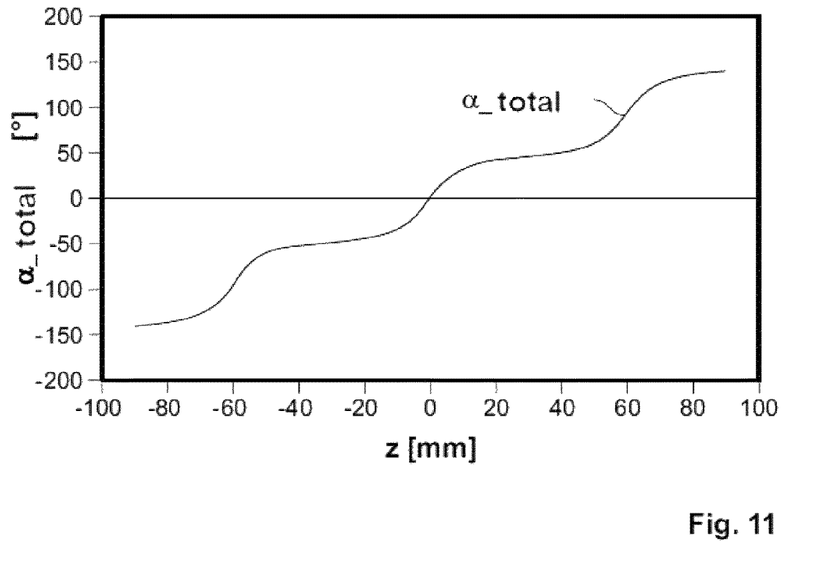
FIG. 11 is an illustration of the path of the total signal belonging to FIG. 10.

Therefore, if the signals α1 to α3 of a series of three Hall probes are added together accordingly, as shown in FIG. 10, and the value obtained is divided by 3, the line path for the angle α_total illustrated in FIG. 11 is obtained specifically for the case of FIG. 10 as the total angle signal in accordance with the deflection z.

A comparison of the coordinate values between FIG. 10 and FIG. 11 shows that the minimum and maximum values do not differ for the combined displacement sensor from those of individual Hall probes, such that the displacement sensor according to the invention having an increased measurement range can be used without additional modifications for subsequent electronic components. The total angle line schematically shown in FIG. 11 can similarly also be formed for more than three Hall probes, the steepness of the sensor signal improving the more individual probes are used.

Figure 12:
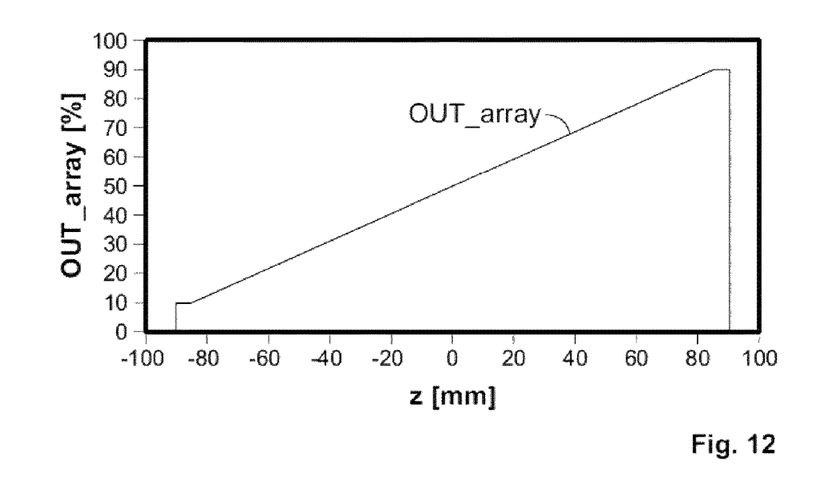
FIG. 12 is a schematic illustration of the total signal in linearised form according to a first embodiment.
Figure 13:
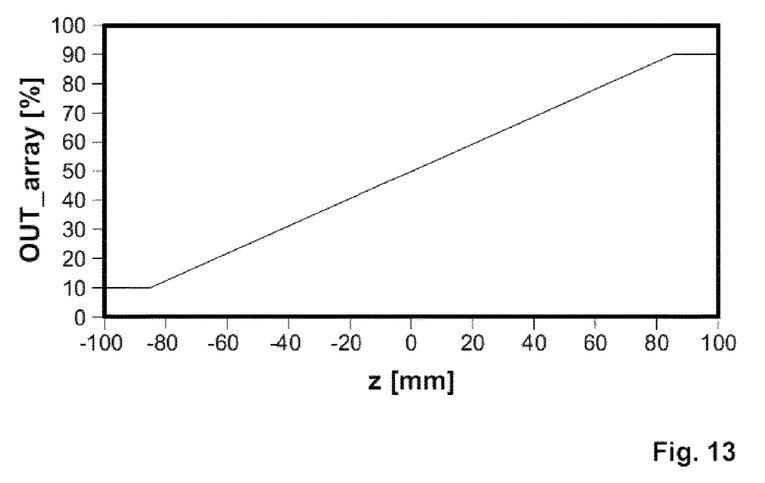
FIG. 13 is a schematic illustration of the total signal in linearised form according to a second embodiment.
Figure 14:
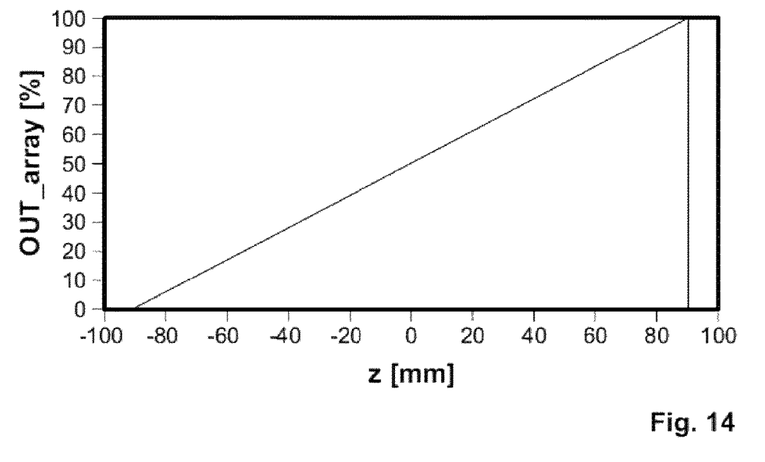
FIG. 14 is a schematic illustration of the total signal in linearised form according to a third embodiment.

The angle line α_total obtained in accordance with FIG. 11 can be linearised in a subsequent step by the evaluation and calculation unit in order to provide a linear path-proportional output signal OUT_array of the displacement sensor. FIGS. 12 to 14 show different variants of the output signals OUT_array, according to how the angular values α1 to α3 and the magnitudes of the magnetic field strengths |B1| to |B3| are adopted in the calculation.

For instance, FIG. 12 shows a variant in which the sensor is switched off in the case of loss of any control by the permanent magnet 102.

FIG. 13 shows an output signal OUT_array which stores the last valid measurement value if control by the magnet is lost for the entire array in the edge regions.

Finally, FIG. 14 shows an output signal line which has been calculated in such a manner that a maximum steepness is achieved in accordance with the path z.

However, it is clear to a person skilled in the art that the signal processing of the individual angle lines can be carried out in extremely different manners as long as it is ensured that there are no discontinuities of the output position signals used for the calculation in the overlap ranges between the individual magnetic field probes 106-1 to 106-N.

REFERENCE SIGNS

| | |
|---|---|
| 100 | Magnetic field sensor |
| 102 | Permanent magnet |
| 104 | Displacement path |
| 106, 106-1, 106-2, . . . 106-N | Magnetic field probe |
| 108 | Evaluation and calculation unit |
| 110 | Storage unit |

The invention claimed is:

1. A displacement sensor for contactlessly measuring a relative position of a magnetic field source which produces a magnetic field and a magnetic field sensor in relation to each other, wherein the magnetic field source and the magnetic field sensor are movable relative to each other, wherein the magnetic field sensor comprises:
a plurality of magnetic field probes for producing a plurality of position signals, each magnetic field probe being constructed in such a manner that it detects at least two spatial components of a magnetic flux density of the magnetic field and produces the position signal from the measured components,
a control and calculation unit for calculating an output signal of the displacement sensor on the basis of the plurality of position signals,
a storage unit for storing the individual position signals, the control and calculation unit being able to be operated in order to calculate a magnitude of the magnetic flux density and to compare the magnitude with a predetermined threshold value in order to output the current calculated position signal for each magnetic field probe if the magnitude of the magnetic flux density is greater than the threshold value and in order to output a preceding position signal previously stored in the storage unit if the magnitude of the magnetic flux density is less than or equal to the threshold value.

2. The displacement sensor according to claim 1, wherein each of the position signals is calculated on the basis of a quotient of the two magnetic flux density components.

3. The displacement sensor according to claim 1, wherein an associated storage unit is arranged at a magnetic field probe or the storage unit is part of the control and calculation unit.

4. The displacement sensor according to claim 3, wherein each magnetic field probe comprises a two or three-dimensional Hall sensor.

5. The displacement sensor according to claim 1, wherein the magnetic field source comprises at least one permanent magnet.

6. The displacement sensor according to claim 1, wherein the magnetic field source produces a magnetic field which is rotationally symmetrical relative to an axis which is defined by a relative linear movement between the magnetic field source and the magnetic field sensor.

7. The displacement sensor according to claim 1, wherein the preceding position signal is output when the magnetic field source is leaving a detection range of the magnetic field sensor.

8. A method for contactlessly measuring a relative position of a magnetic field source which produces a magnetic field and a magnetic field sensor in relation to each other, wherein the magnetic field source and the magnetic field sensor are movable relative to each other, wherein the magnetic field sensor comprises a plurality of magnetic field probes for producing a plurality of position signals, each magnetic field probe detecting at least two spatial components of a magnetic flux density of the magnetic field and producing the position signal from the measured components, and wherein the method comprises the following steps:
calculating the plurality of position signals on the basis of a quotient of the two magnetic flux density components,
calculating a magnitude of the magnetic flux density at the position of each magnetic field probe and comparing the magnitude with a predetermined threshold value,
outputting the current calculated position signal if the magnitude of the magnetic flux density is greater than the threshold value,
outputting a preceding position signal previously stored in the storage unit if the magnitude of the magnetic flux density is less than or equal to the threshold value,
storing the output position signals for each magnetic field probe, and
calculating an output signal of the displacement sensor on the basis of the plurality of position signals.

9. The method according to claim 8, wherein the step of calculating the output signal of the displacement sensor on the basis of the plurality of position signals comprises: adding together the plurality of position signals and dividing the total by a total number of the magnetic field probes.

10. The method according to claim 8, wherein each magnetic field probe comprises a two or three-dimensional Hall sensor.

11. The method according to claim 8, wherein the magnetic field source comprises at least one permanent magnet.

12. The method according to claim 8, wherein the calculation of each position signal comprises:
establishing an angle α according to $$\alpha = \arctan\left(\frac{Bz}{By}\right);$$

linearizing the angle α in order to produce a displacement-proportional position signal for each magnetic field probe.

13. The method according to claim 8, wherein the calculation of the magnitude of the magnetic flux density is carried out by calculating the vector magnitude from the at least two spatial components of the magnetic flux density of the magnetic field.

14. The method according to claim 8, wherein the storage of the position signals comprises the storage of a value of the angle $$\alpha = \arctan\left(\frac{Bz}{By}\right);$$

and/or the storage of a linearized value of the angle.

15. The method according to claim 8, wherein the preceding position signal is output when the magnetic field source is leaving a detection range of the magnetic field sensor.

* * * * *